United States Patent [19]
Phipps

[11] Patent Number: 4,471,511
[45] Date of Patent: Sep. 18, 1984

[54] RELEASABLE CONNECTOR

[75] Inventor: John A. Phipps, Farncombe, England

[73] Assignee: RFD Limited, Surrey, England

[21] Appl. No.: 474,450

[22] Filed: Mar. 11, 1983

[30] Foreign Application Priority Data

Mar. 11, 1982 [GB] United Kingdom ................ 8207135

[51] Int. Cl.³ .............................................. B66C 1/38
[52] U.S. Cl. .............................. 24/241 SP; 294/83 R
[58] Field of Search ........... 24/241 R, 241 P, 241 PP, 24/241 PS, 241 SB, 233; 294/83 R

[56] References Cited

U.S. PATENT DOCUMENTS

| | | | |
|---|---|---|---|
| 2,413,392 | 12/1946 | Veverka | 24/241 SB X |
| 2,987,341 | 6/1961 | Peck et al. | 24/241 PP X |
| 3,341,244 | 9/1967 | Johnson | 294/83 R X |
| 3,436,795 | 4/1969 | Hill | 24/241 PS |
| 3,457,603 | 7/1969 | Romanzi, Jr. | 24/241 SB |
| 3,918,758 | 11/1975 | Fournier | 24/233 X |
| 3,998,487 | 12/1976 | Biondo | 24/241 PL X |
| 4,379,579 | 4/1983 | Mahan et al. | 24/241 SB X |

Primary Examiner—William E. Lyddane
Assistant Examiner—Peter A. Aschenbrenner
Attorney, Agent, or Firm—Birch, Stewart, Kolasch & Birch

[57] ABSTRACT

A releasable connector for connecting a shackle bolt on a liferaft to the depending end of a davit cable is set in a safe condition for boarding and lowering of the liferaft. In the safe condition, a hook member supports the shackle bolt and is itself locked in its supporting position by a latch member. A coupling spring connected between the hook member and the latch member operates to one side of its dead-center position to urge the latch member into the locking position. A first downward pull on a lanyard causes a pawl member to engage a tooth on the latch member to move the latch member from its locking position to a drive position in which the coupling spring operates to the other side of its dead-center position and urges the latch member into its drive position. When the liferaft takes up a floating position on the water, the load on the sackle bolt is relieved and automatic release of the shackle bolt effected under the action of the coupling spring which turns the hook member out of its supporting position. If the automatic release fails, the lanyard is given a second pull which brings the pawl member, which has returned under spring loading, to engage a second tooth on the latch member and cause the latch member to execute a driving movement in which it displaces the hook member out of its supporting position for release of the shackle bolt. A first pull on the lanyard results only in the cocking of the connector for automatic release and cannot result in manual release. A second pull on the lanyard is required to effect manual release.

7 Claims, 5 Drawing Figures

RELEASABLE CONNECTOR

BACKGROUND AND SUMMARY OF THE INVENTION

The present invention relates to releasable connectors for releasably connecting two elements together and is particularly although not exclusively concerned with a releasable connector for releasably supporting a load from the depending end of a cable.

In one method of launching an inflatable liferaft from the deck of a ship in an emergency, a packed uninflated liferaft is attached to a davit cable and is brought by the davit from a position on the deck to a position overhanging the side of the ship, in which position it is inflated and then boarded by evacuees. The liferaft is then lowered on the davit cable until it comes to rest on the water. The liferaft needs to be held secure to the end of the davit cable during launching but readily releasable from the cable when the liferaft takes up a self-supporting floating position on the water.

In prior British Patent Specification No. 910904, a releasable connector has been proposed which provides for automatic release of the liferaft from the davit cable when the liferaft enters the water and which also provides for manual release by an occupant of the liferaft in the event that the automatic release fails. During launching and lowering of the liferaft the connector is arranged to hold a safe position in which it will not automatically release and to be moved to a cocked position for automatic release by an occupant of the liferaft pulling on a release lanyard just prior to the liferaft entering the water. In the event that the automatic release fails when the liferaft enters the water an occupant of the liferaft can override the automatic release by pulling on the lanyard and with the connector only lightly loaded in this condition effect manual release.

Although the connector hitherto proposed has operated generally satisfactorily there are circumstances which although very remote can give rise to premature release of the liferaft from the davit cable. For example, the connector is arranged to be manually releasable only when lightly loaded as when the liferaft is floating on the water and is intended to be manually releasable in this situation only. With an inflated liferaft at the boarding position and carrying one occupant only, it is possible that the occupant could achieve premature release of the lightly laden liferaft by exerting a very heavy pull on the lanyard. This may be done for example in circumstances where the occupant fails to observe the instructions or accidentally pulls on the lanyard in an effort to maintain his balance when boarding the liferaft. There is also the possibility of the release lanyard becoming caught up or tangled in the folds of the liferaft during inflation of the liferaft, which could result in a pull on the lanyard sufficient to cause premature release of the connector.

Although the circumstances likely to give rise to premature release of a liferaft from a davit cable when using a releasable connector as hitherto proposed are remote it is an object of the present invention to provide a releasable connector which reduces still further the possibility of premature release of the liferaft from the cable.

According to the present invention, there is provided a releasable connector for releasably connecting together first and second elements comprising a support structure to which the first element is secured, a first securing member for releasably securing the second element to the support structure and mounted on the support structure for movement between a securing position in which it so cooperates with the support structure as to prevent the second element from releasing from the support structure and a release position in which it no longer prevents release of the second element from the support structure, a second securing member mounted on the support structure for movement firstly from a retention position in which it retains the first securing member in its securing position and prevents it from moving to its release position, to a drive position in which it no longer retains the first securing member in the securing position and in which it drivingly engages the first securing member and then in a driving movement from the drive position to a release position in which driving movement it drivingly engages the first securing member to cause displacement of the first securing member from the securing position to its release position, and means for moving the second securing member from its retention position to its drive position and from its drive position to its release position comprising a drive member which is mounted on the supporting structure, which is movable between a first stop position to which it is biased and a second stop position and which so engages the second securing member that when the drive member is moved in a first traverse from its first stop position to its second stop position against the biasing action it moves the second securing member from the retention position to the drive position and upon release returns under the biasing action to the first stop position without the return of the second securing member to the retention position and in a second traverse from its first stop position to its second stop position against the biasing action it moves the second securing member from its drive position to its release position thereby to move the first securing member from its securing position to its release position.

In an embodiment of the invention the drive member is so constructed and arranged as to cooperate with first and second ratchet teeth on the second securing member. The drive member in a first traverse engages with the first of the ratchet teeth to move the second securing member from its retention position to its drive position and in a second traverse engages with the second of the ratchet teeth to move the second securing member through its driving movement in which it moves the first securing member to its release position.

In an embodiment of the invention hereinafter to be described, the drive member is movable through its first and second traverses by manually exerting a pull on a lanyard connected to the drive member. The first and second securing members are preferably pivotally mounted on the support structure and the drive member mounted on the support structure for movement in an arcuate path about the pivotal axis of the second securing member.

In the embodiment of the invention hereinafter to be described, the first of the two elements to be connected together is the depending end of a davit cable and the second of the elements is in the form of a shackle bolt secured to one end of a liferaft to be suspended from the cable. The support structure is so shaped as to allow upward penetration of the shackle bolt into the support structure and the first securing member is so mounted on the support structure and so shaped that it is biased to its securing position by the downwardly directed force applied to it by the shackle bolt.

In the embodiment of the invention hereinafter to be described, the first and second securing members are coupled together by a coupling spring which in a first position to one side of a dead-center position holds the second securing member in the retention position and in a second position to the other side of the dead-center position urges the second securing member into its drive position. With the second securing member moved to its drive position by a first traverse of the drive member and with the load applied by the shackle bolt to the first securing member relieved, the drive from the coupling spring operating to the other side of its dead-center position moves the second securing member through its driving movement and the first securing member to its release position.

In operation, a first pull on the lanyard causes the drive member to move through a first traverse from its first stop position to its second stop position and by its engagement with the first of the ratchet teeth of the second securing member to pivot it from its retention position to its drive position in which it is out of locking engagement with the first securing member and in which it drivingly bears against the second securing member under the action of the coupling spring. Upon release of the pull on the lanyard the drive member returns to the first stop position, riding over the first of the ratchet teeth and leaving the second securing member biased by the coupling spring to its drive position in engagement with the first securing member. The drive member upon returning to the first stop position drops into engagement with the second ratchet tooth of the second securing member. Providing no further pull is applied to the lanyard the first securing member maintains support for the shackle bolt while the latter is subjected to a downward force created by the liferaft.

Upon the liferaft taking up a floating disposition on the water the downward force applied by the shackle bolt on the first securing member is relieved whereupon the latter pivots to its release position under the drive from the coupling spring operating to the other side of its dead-center position. In the event that the first securing member does not move automatically to its release position under the action of the coupling spring, release of the shackle bolt can then be manually effected by pulling again on the lanyard to move the drive member through a second traverse, thereby causing the second securing member to execute its driving movement in which it turns the first securing member to its release position for release of the shackle bolt.

BRIEF DESCRIPTION OF THE DRAWINGS

One embodiment of the invention will now be described by way of example with reference to the accompanying drawings in which.

DETAILED DESCRIPTION OF THE INVENTION

Figure 1:
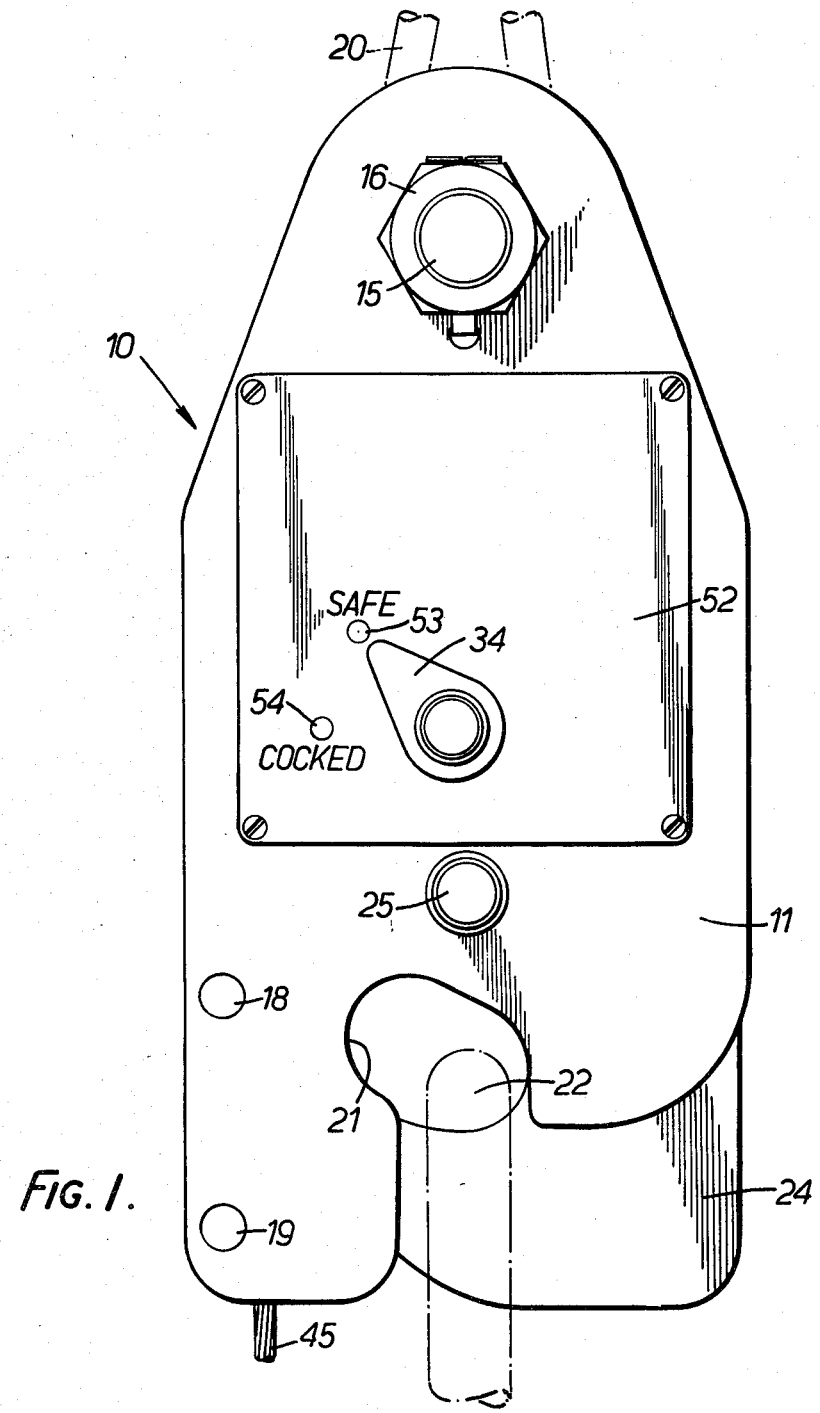
FIG. 1 is a front elevation of a releasable connector for releasably connecting a davit launched liferaft to a davit cable in accordance with the invention and illustrating the connector in a safe condition.
Figure 2:
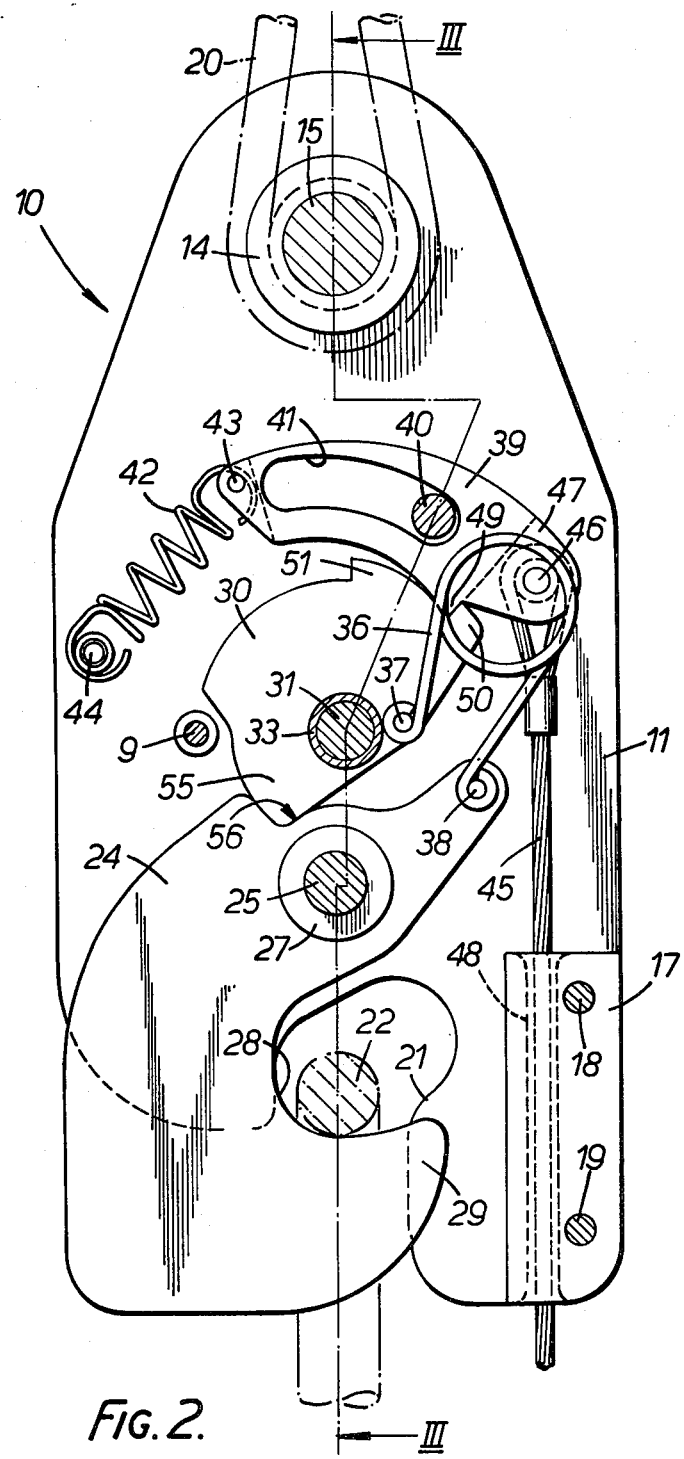
FIG. 2 is a rear elevation of the connector shown in FIG. 1 with a back plate removed.
Figure 3:
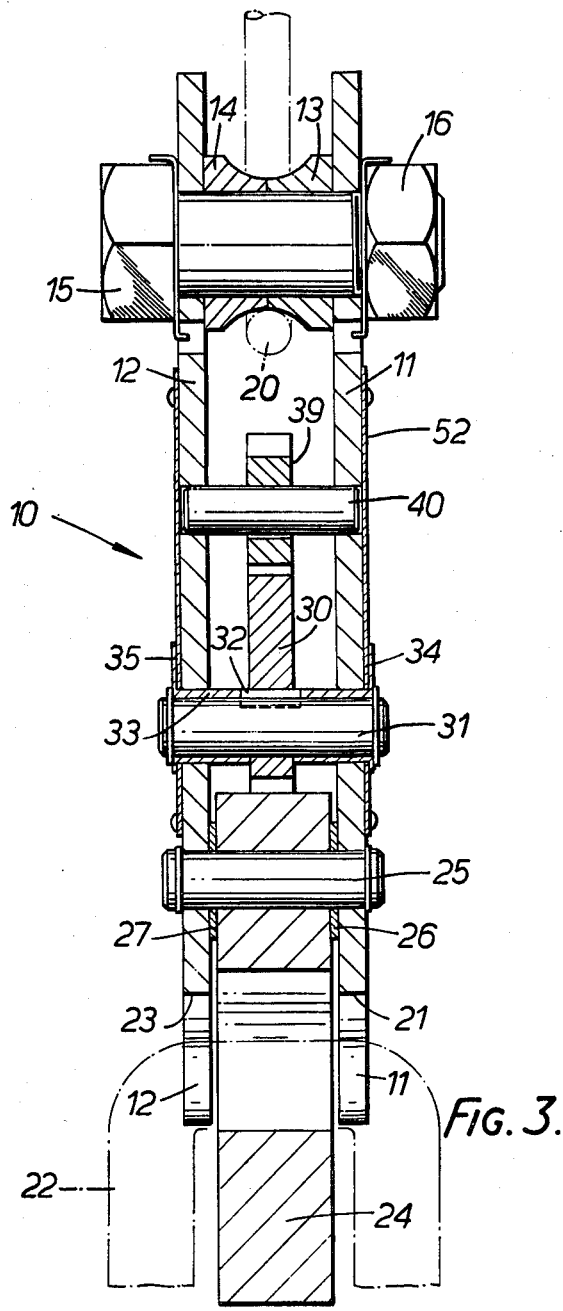
FIG. 3 is a cross-section of the connector shown in FIGS. 1 and 2, taken on the line III—III in FIG. 2.

Referring first to FIGS. 1 to 3 of the drawings a support structure 10 of the releasable connector shown comprises front and back plates 11 and 12 held in spaced parallel relationship at their upper ends by abutting cone spacers 13 and 14 supported by a headed bolt 15 and clamped together by a nut 16 screwed on to the bolt 15, at their lower ends by a guide block 17 to which the two plates 11 and 12 are clamped by rivets 18 and 19 which pass through the plates 11 and 12 and the block 17 and at an intermediate point by a shouldered rivet 9. Additionally, the cone spacers 13 and 14 serve as a bearing surface for the depending looped end of a davit cable 20. The front plate 11 illustrated in FIGS. 1 and 2 is cut away at its lowermost end to provide a recess 21 for reception of an upper part of a shackle bolt 22 secured to one end of the liferaft to be supported by the davit cable 20. The back plate 12, shown only in FIG. 3, is of the same size and configuration as the front plate 11 and is cut away in the same manner as to provide a corresponding recess 23 for receiving the shackle bolt 22.

A hook member 24, as best seen in FIG. 2, is pivotally mounted on a shaft 25 so as to be freely pivotal on the shaft and is held in spaced relation from the inner surfaces of the front and back plates 11 and 12 by spacers 26 and 27. The hook member 24 is formed with a recess 28 and a projecting support portion 29 which serves to support the shackle bolt 22 when the hook member 24 is in the securing position illustrated in FIG. 2 of the drawings.

A latch member 30 is, as shown in FIGS. 2 and 3, mounted between the front and back plates 11 and 12 on a shaft 31 to which it is keyed by a key 32. The shaft 31 carries a sleeve 33 also keyed thereto by the key 32 and the assembly of the shaft 31 and the sleeve 33 is rotatably mounted at its ends in the front and back plates 11 and 12. The sleeve 33 is formed at its ends with pointers 34 and 35, the former of which is best seen in FIG. 1, which serve in a manner hereinafter to be described to indicate the angular disposition of the latch member 30. A coupling spring 36 is secured at one end to a pin 37 on the latch member 30 and at its other end to a pin 38 carried on the uppermost end of the hook member 24. The coupling spring 36 serves to exert in a manner hereinafter to be described turning forces on the latch member 30 and the hook member 24 depending upon the disposition of the pin 37 in relation to its dead-center position on the line joining the axis of the shaft 31 and the axis of the pin 38.

Referring again to FIG. 2, a displaceable pawl member 39 is mounted between the plates 11 and 12 on a pawl pin 40 carried at its ends by the plates 11 and 12. The pawl member 39 is supported by the pin 40 by engagement of the pin 40 in a slot 41 in the pawl member 39 and is held in a retracted position in which the pin 40 engages with one end of the slot 41 as shown in FIG. 2 by the biasing action of a tension spring 42 one end of which is secured to a pin 43 on the rearmost end of the pawl member 39 and the other end of which is secured to an anchor pin 44 extending between and mounted at its ends in the plates 11 and 12. A lanyard 45 is formed with an upper looped end which is secured to a forward end of the pawl member 39 by a pin 46 extending between forwardly extending lugs on the pawl member 39, one of which is shown at 47 in FIG. 2. The lanyard 45 passes through a bore 48 formed in the guide block 17 and extends downwardly from the block 17 to an extent which will allow an occupant of the liferaft to grasp it and pull it downwardly without difficulty. The pawl member 39 is formed with an abutment 49 which in operation of the pawl member 39 engages with teeth 50 and 51 of a ratchet profile on the periphery of the latch member 30.

As will be seen from FIG. 1 the plate 11 is provided with an instruction plate 52 on which are indicated safe and cocked positions 53 and 54 to which the pointer 34 is directed depending upon the angular disposition of the latch member 30. With the latch member 30 in the position illustrated in FIGS. 1 to 3 the pointer 34 is directed to the safe position 53. The plate 12 is likewise fitted with an instruction plate identical to the plate 52 so that the pointer 35 can likewise indicate to an observer the safe and cocked positions of the latch member 30.

Operation of the connector during the launching of a liferaft will now be described. Each end of a liferaft (not shown) is connected by a shackle bolt 22 to a releasable connector suspended as described from the end of a davit cable. The connector is set in the safe position shown in FIG. 2 and the safe position maintained during the initial deployment of the liferaft over the side of the ship and during loading of the liferaft with evacuees. In the safe position, the hook member 24 securely supports the shackle bolt 22 and is itself held in the securing position by a projecting portion 55 of the latch member 30 engaging in a recess 56 of the hook member 24. The pawl member 39 is, in the safe position of the connector, held by the spring 42 in the retracted position shown in FIG. 2 with the abutment 49 in engagement with the tooth 50 of the latch member 30.

Figure 4:
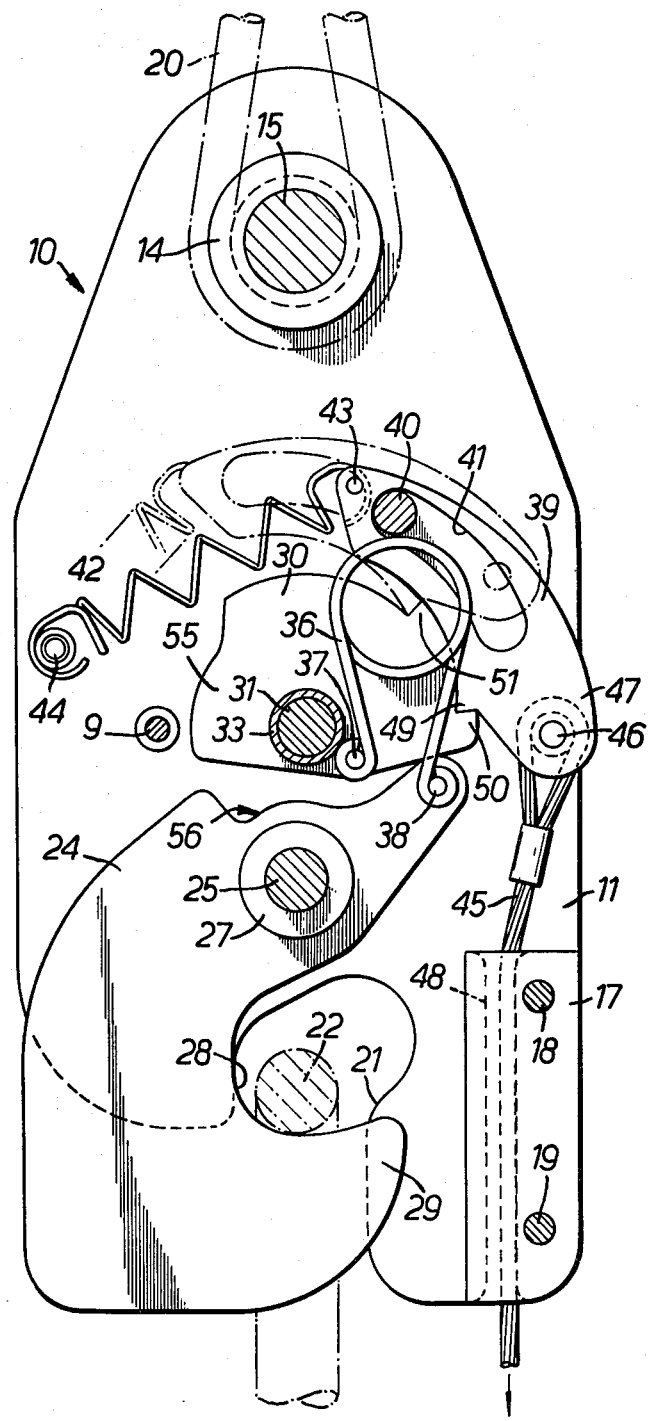
FIG. 4 is a rear elevation corresponding to that shown in FIG. 2 and illustrating the connector in a cocked condition.

During descent of the liferaft a crew member or an occupant of the liferaft authorised to undertake the operation exerts a downward pull on the lanyard 45 to move the latch member 30 from the safe position 53 shown in FIG. 2 to the cocked position 54 shown in FIG. 4. The downward pull causes the pawl member 39 to move against the action of the biasing spring 42 forwardly from the retracted position shown in FIG. 2 to its forward stop position shown in FIG. 4 in which the pin 40 bears against the rearmost end of the slot 41. During this movement, the pawl member 39 by engagement of its abutment 49 with the tooth 50 on the latch member 30 turns the latch member 30 to the position shown in FIG. 4 so that the projecting portion 55 of the latch member 30 moves clear of the recess 56 of the hook member 24 and the pin 37 moves across the dead-center line joining the axes of the shaft 31 and the pin 38 whereupon the latch member 30 under the action of the coupling spring 36 is brought to bear upon the upper end of the hook member 24 as shown in FIG. 4. Upon release of the lanyard 45, the pawl member 39 returns to its retracted position and drops in to engagement with the tooth 51 of the latch member 30 as shown in chain dot line in FIG. 4, the latch member 30 having retained its position abutting the upper end of the hook member 24. The pointers 34 and 35 have during this movement turned from the safe position 53 shown in FIG. 1 to the position indicating that the connector has been cocked for automatic release.

The liferaft with the connectors in the cocked positions descends on the davit cables and takes up a floating position on the water. The load on each shackle bolt 22 is immediately relieved and automatic release of the shackle bolt 22 is effected by the action of the coupling spring 36, which exerts a clockwise turning movement on the hook member 24. In the event that the hook member 24 does not automatically move to a position to release the shackle bolt 22, release can then be effected by an occupant of the liferaft giving a further pull on the lanyard 45.

Figure 5:
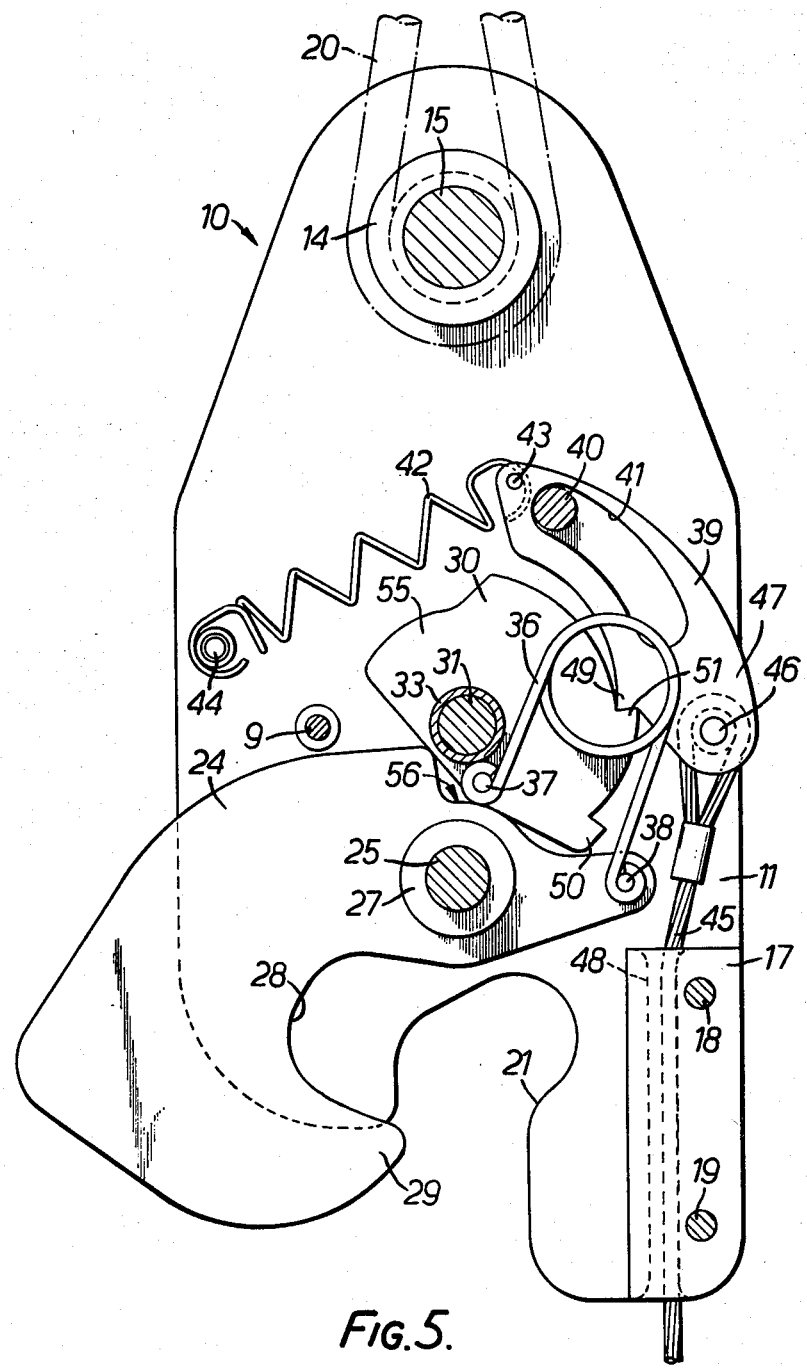
FIG. 5 is a rear elevation corresponding to that shown in FIG. 2 and illustrating the connector in a release condition.

In response to the further pull, the pawl member 39 makes a further forward excursion from the position shown in chain dot line in FIG. 4 to the position shown in FIG. 5 and by engagement of it with the tooth 51 causes the latch member 30 to turn clockwise to the position shown in FIG. 5. With the latch member 30 bearing against the upper end of the hook member 24, the hook member 24 is thereby also caused to turn clockwise from the position shown in FIG. 2 to the release position shown in FIG. 5 in which the hook portion 29 has moved clear of the recess 21 to permit the release of the shackle bolt 22.

It will be apparent that an inadvertent pulling of the lanyard 45 by an occupant of the liferaft when for example attempting either to steady himself or to prevent himself from falling can result only in the cocking of the latch member 30. The pull no matter how heavy or sustained cannot give rise to movement of the hook member 24 to the release position. A second pull on the lanyard 45 is required to effect movement of the hook member 24 to the release position. The chances of the occupant exerting an inadvertent second pull on the lanyard 45 become very remote indeed and the possibility of premature release in the circumstances hereinbefore set forth can be ignored.

I claim:

1. A releasable connector for releasably connecting together first and second elements comprising a support structure to which the first element is secured, a first securing member for releasably securing the second element to the support structure and mounted on the support structure for movement between a securing position in which it so cooperates with the support structure as to prevent the second element from releasing from the support structure and a release position in which it no longer prevents release of the second element from the support structure, a second securing member mounted on the support structure for movement firstly from a retention position in which it retains the first securing member in its securing position and prevents it from moving to its release position to a drive position in which it no longer retains the first securing member in the securing position and in which it drivingly engages the first securing member and then in a driving movement from the drive position to a release position in which driving movement it drivingly engages the first securing member to cause displacement of the first securing member from the securing position to its release position, and means for moving the second securing member from its retention position to its drive position and from its drive position to its release position comprising a drive member which is mounted on the support structure for forward and return movements between a first stop position to which it is biased and a second stop position and which so engages the second securing member that when the drive member is moved in a first forward movement from its first stop position to its second stop position against the biasing action it moves the second securing member from the retention position to the drive position and upon release returns under the biasing action to the first stop position without the return of the second securing member to the retention position and in a second forward movement from its first stop position to its second stop position against the biasing action it moves the second securing member from its drive position to its release position thereby to move the first securing member from its securing position to its release position.

2. A connector according to claim 1, wherein the drive member is so constructed and arranged as to co-operate with first and second ratchet teeth on the second securing member, and wherein the drive member in a first forward movement engages with the first of the ratchet teeth to move the second securing member from its retention position to its drive position and in a second forward movement engages with the second of the ratchet teeth to move the second securing member through its driving movement in which it moves the first securing member to its release position.

3. A connector according to claim 1 wherein the drive member is movable through its first and second forward movement by manually exerting a pull on a lanyard connected to the drive member.

4. A connector according to claim 1, wherein the first and second securing members are pivotally mounted on the support structure and the drive member is mounted on the support structure for forward and return movements in an arcuate path about the pivotal axis of the second securing member.

5. A connector according to claim 1, wherein the first of the two elements to be connected together is the depending end of a cable, and wherein the second of the elements is in the form of a shackle bolt secured to one end of a load to be suspended from the cable.

6. A connector according to claim 5, wherein the support structure is so shaped as to allow upward penetration of the shackle bolt into the support structure, and wherein the first securing member is so mounted on the support structure and so shaped that it is biased to its securing position by the downwardly directed force applied to it by the shackle bolt.

7. A connector according to claim 6, wherein the first and second securing members are coupled together by a coupling spring which in a first position to one side of a dead-center position holds the second securing member in the retention position and in a second position to the other side of the dead-center position urges the second securing member into its drive position, and wherein with the second securing member moved to its drive position by a first forward movement of the drive member and with the load applied by the shackle bolt to the first securing member relieved, the drive from the coupling spring operating to the other side of its dead-center position moves the second securing member through its driving movement and the first securing member to its release position.

* * * * *